(12) United States Patent
Tao et al.

(10) Patent No.: US 10,256,735 B2
(45) Date of Patent: Apr. 9, 2019

(54) POWER SUPPLY WITH NEAR VALLEY SWITCHING

(71) Applicant: FAIRCHILD SEMICONDUCTOR CORPORATION, San Jose, CA (US)

(72) Inventors: Zhibo Tao, Palo Alto, CA (US); Jung-Sheng Chen, Kaohsiung (TW); Li Lin, Hsinchu (TW); Kai-Fang Wei, Hsinchu (TW); Chih-Hsien Hsieh, Hsinchu (TW); Hangseok Choi, Bedford, NH (US); Yue-Hong Tang, Hsinchu (TW)

(73) Assignee: FAIRCHILD SEMICONDUCTOR CORPORATION, Phoenix, AZ (US)

(*) Notice: Subject to any disclaimer, the term of this patent is extended or adjusted under 35 U.S.C. 154(b) by 43 days.

(21) Appl. No.: 15/053,263

(22) Filed: Feb. 25, 2016

(65) Prior Publication Data
US 2016/0261201 A1    Sep. 8, 2016

Related U.S. Application Data

(60) Provisional application No. 62/129,546, filed on Mar. 6, 2015.

(51) Int. Cl.
*H02M 3/335*    (2006.01)
*H02M 1/00*     (2006.01)

(52) U.S. Cl.
CPC ....... *H02M 3/33523* (2013.01); *H02M 3/335* (2013.01); *H02M 2001/0054* (2013.01); *Y02B 70/1433* (2013.01); *Y02B 70/1491* (2013.01); *Y02P 80/112* (2015.11)

(58) Field of Classification Search
CPC .................................................. H02M 3/33523
See application file for complete search history.

(56) References Cited

U.S. PATENT DOCUMENTS

| | | |
|---|---|---|
| 7,142,439 B2 | 11/2006 | Oh |
| 7,269,038 B2 | 9/2007 | Shekhawat et al. |
| 7,323,825 B2 | 1/2008 | Hwang et al. |
| 7,518,895 B2 | 4/2009 | Shekhawat et al. |
| 7,531,966 B2 | 5/2009 | Hwang et al. |
| 7,576,446 B2 | 8/2009 | Khasiev |
| 7,791,909 B2 | 9/2010 | Koo et al. |
| 7,839,666 B1 | 11/2010 | Li |

(Continued)

OTHER PUBLICATIONS

EE Times—Exploring quasi-resonant converters for power supplies, Oct. 21, 2009, 5 pages [retrieved on Feb. 16, 2015], retrieved from the Internet: http://www.eetimes.com/document.asp?doc_id=1273934.

(Continued)

*Primary Examiner* — Jue Zhang
*Assistant Examiner* — Trinh Q Dang
(74) *Attorney, Agent, or Firm* — AMPACC Law Group, PLLC (57) ABSTRACT

A switched-mode power supply with near valley switching includes a quasi-resonant converter. The converter includes a switch element that is turned on not only at the valley, but also in a window range of $\Delta t_{NVW}$ close to the valley, where the voltage across the switch element is at its minimum. This advantageously reduces switching loss and maintains a balance between efficiency and frequency variation.

14 Claims, 9 Drawing Sheets

(56) References Cited

U.S. PATENT DOCUMENTS

| | | | |
|---|---|---|---|
| 8,098,505 B1 | 1/2012 | Choi | |
| 8,320,140 B2 | 11/2012 | Li | |
| 8,335,061 B2 | 12/2012 | Koo et al. | |
| 8,415,891 B2 | 4/2013 | Cho et al. | |
| 8,482,886 B2 | 7/2013 | Koo et al. | |
| 8,625,308 B2 | 1/2014 | Kim et al. | |
| 8,817,498 B2 | 8/2014 | Choi | |
| 8,947,893 B2 | 2/2015 | Kim et al. | |
| 9,331,604 B2 | 5/2016 | Koo et al. | |
| 2006/0198167 A1* | 9/2006 | Nakamura | H02M 1/36 363/16 |
| 2009/0091955 A1* | 4/2009 | Choi | H02M 3/33507 363/37 |
| 2013/0107584 A1* | 5/2013 | Li | H02M 1/08 363/21.12 |
| 2014/0016365 A1* | 1/2014 | Maruyama | H02M 3/33507 363/21.02 |
| 2016/0094130 A1* | 3/2016 | Yang | H02M 3/33561 363/21.12 |

OTHER PUBLICATIONS

Fairchild—FSQ0465RS/RB—Green-Mode Fairchild Power Switch (FPS) for Quasi-Resonant Operation, Dec. 2009, 23 pages.

\* cited by examiner

$$Vin := 370 \quad nVo := 70 \quad DE := \frac{\pi \cdot 1}{6}$$

$$\underbrace{\dfrac{\int_{\frac{\pi}{2}+DE}^{3\frac{\pi}{2}-DE}(Vin-nVo\cdot\cos(x))^2\,dx}{\pi-2\cdot DE}}_{} \dfrac{\int_0^{2\pi}(Vin-nVo\cdot\cos(x))^2\,dx}{2\cdot\pi} = 0.7$$

402

$$\dfrac{(Vin-nVo)^2}{\dfrac{\int_0^{2\pi}(Vin-nVo\cdot\cos(x))^2\,dx}{2\cdot\pi}} = 0.646$$

401

$$Vin := 370 \quad nVo := 70 \quad DE := \frac{\pi \cdot 2}{6}$$

$$\dfrac{\dfrac{\int_{\frac{\pi}{2}+DE}^{3\frac{\pi}{2}-DE}(Vin-nVo\cdot\cos(x))^2\,dx}{\pi-2\cdot DE}}{\dfrac{\int_0^{2\pi}(Vin-nVo\cdot\cos(x))^2\,dx}{2\cdot\pi}} = 0.66$$

POWER SUPPLY WITH NEAR VALLEY SWITCHING

CROSS-REFERENCE TO RELATED APPLICATION

This application claims the benefit of U.S. Provisional Application No. 62/129,546, filed on Mar. 6, 2015, which is incorporated herein by reference in its entirety.

BACKGROUND OF THE INVENTION

1. Field of the Invention

The present invention relates generally to electrical circuits and more particularly, but not exclusively, to quasi-resonant converters.

2. Description of the Background Art

A switched mode power supply (SMPS) includes a switch element (also known as a "primary switch"), such as a metal oxide semiconductor field effect transistor (MOSFET), to convert an alternating current (AC) source to a regulated DC output voltage. The switching of the switch element may be controlled by pulse width modulation (PWM) or other control scheme. An SMPS may include a converter that transforms a direct current (DC) voltage to another DC voltage. For example, an SMPS may include a quasi-resonant converter. In a typical quasi-resonant converter, the switch element is turned on when the voltage across the switch element is at its minimum at resonance, which is also referred to as the "valley", to reduce switching loss.

U.S. Pat. No. 7,791,909, which is incorporated herein by reference in its entirety, discloses an example of a quasi-resonant converter that uses a MOSFET as the switch element. In the '909 patent, the MOSFET being used as the switch element is prohibited from being turned on during a blanking period TB (e.g., see FIG. 1A). After expiration of the banking period, the MOSFET is turned on when the valley of the drain-source voltage VDS of the MOSFET is detected within a timeout period. The MOSFET is forced to turn on if the valley is not detected within the timeout period. In this case, it may have higher switching loss due to potentially high VDS voltage across the MOSFET when the MOSFET is turned on, which is also referred to as "hard switching".

Figures 1A, 1B:
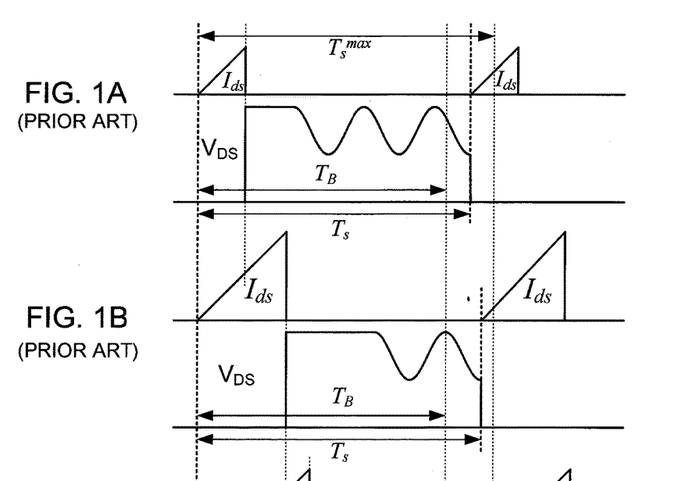
FIGS. 1A-1D show waveforms that illustrate the basic operation of a quasi-resonant converter with valley switching.
Figure 1C:
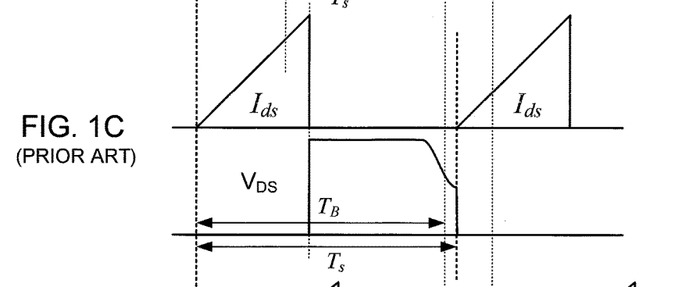
Figure 1D:
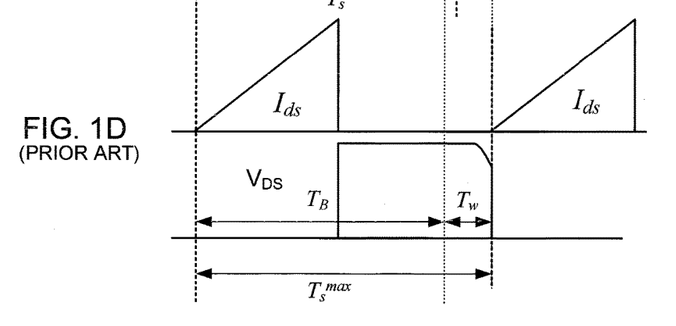

The basic operation of the quasi-resonant converter of the '909 patent is illustrated in FIGS. 1A-1D. In FIGS. 1A-1D, the current IDS is the drain-source current of the MOSFET, VDS is the drain-source voltage of the MOSFET, TB is the blanking period, TS is the switching time, TW is the waiting period, and TSMAX is the timeout period. As shown in FIG. 1A, after the MOSFET is turned off, the MOSFET is not turned on until after the valley is detected after expiration of the blanking period. FIG. 1B illustrates a scenario where the valley is detected during the waiting period after one resonance cycle and FIG. 1C illustrates a scenario where the valley is detected during the waiting period within the first resonance cycle. FIG. 1D illustrates a scenario where the valley is not detected within the waiting period. In that scenario, the MOSFET is forced to turn on after expiration of the timeout period.

Figure 2:
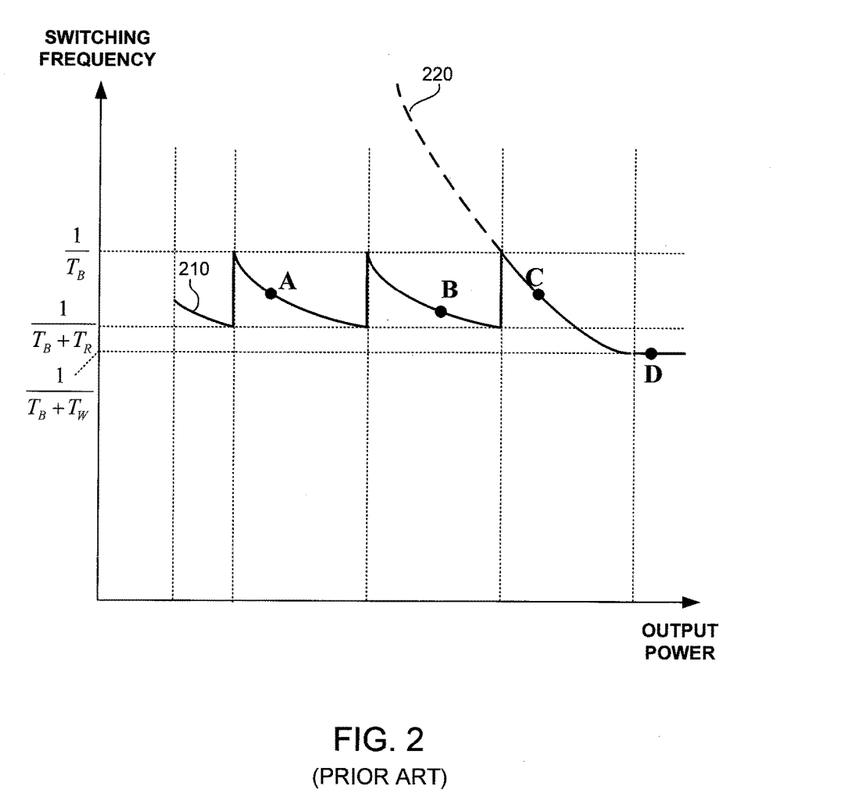
FIG. 2 shows plots of switching frequency versus output power in quasi-resonant converters with valley switching.

FIG. 2 shows plots of switching frequency versus output power in quasi-resonant converters with valley switching, such as in the '909 patent (see curve 210) and other quasi-resonant converters with valley switching (see curve 220). In the example of FIG. 2, the points A, B, C, and D correspond to the scenarios of FIGS. 1A, 1B, 1C, and 1D, respectively. Note the variation in switching frequency depending on when the valley is detected.

To ensure valley switching, the timeout period should be longer than the blanking period plus a resonance ring period. That is, $$TSMAX > T_B + T_{RING}$$

where TSMAX is the timeout period, TB is the blanking period, and TRING is the resonance ring period. This results in relatively wide frequency variation (see FIG. 2), which is not desirable in applications that require a limited switching frequency range. Otherwise, the MOSFET is forced to be turned on when the timeout period expires, thereby causing hard switching and larger switching losses.

SUMMARY

In one embodiment, a switched-mode power supply with near valley switching includes a quasi-resonant converter. The converter includes a switch element that is turned on not only at the valley, but also in a window range of $\Delta t_{NVW}$ close to the valley (also referred to as "near valley"), where the voltage across the switch element is at its minimum, thus reducing switching loss and maintaining a balance between efficiency and frequency variation caused by valley switching.

These and other features of the present invention will be readily apparent to persons of ordinary skill in the art upon reading the entirety of this disclosure, which includes the accompanying drawings and claims.

DESCRIPTION OF THE DRAWINGS

The use of the same reference label in different drawings indicates the same or like components.

DETAILED DESCRIPTION

In the present disclosure, numerous specific details are provided, such as examples of electrical circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Fixed frequency switching, or hard switching, has high switching losses due to potentially high VDS voltage across a MOSFET that is employed as a switch element of an SMPS. Pure valley switching (also referred to herein as "valley switching") reduces switching losses by turning on the MOSFET at the minimum of the VDS voltage across the MOSFET, but suffers from large variations in switching frequency due to variant resonant ring period. With system switching frequency band limitation, a new approach is needed to maintain a balance between efficiency and frequency variation, such as the now described near valley switching.

Embodiments of the present invention pertain to an SMPS with near valley switching. Instead of turning on the switch element only at the valley where the voltage across the switch element is at its minimum at resonance, embodiments of the present invention allow for turning on the switch element not just at the valley but also at points in time near the valley. For example, the switch element may be turned on at resonance based on when the blanking period ends relative to a near valley detection window. The near valley detection window advantageously allows the switch element to be turned on either on the downswing or the upswing of the voltage across the switch element, allowing for more chances to turn on the switch element after the blanking period and thereby preventing a scenario where the switch element is forced to turn on at the expiration of the timeout period. Near valley switching is further explained beginning with FIG. 3.

Figure 3:
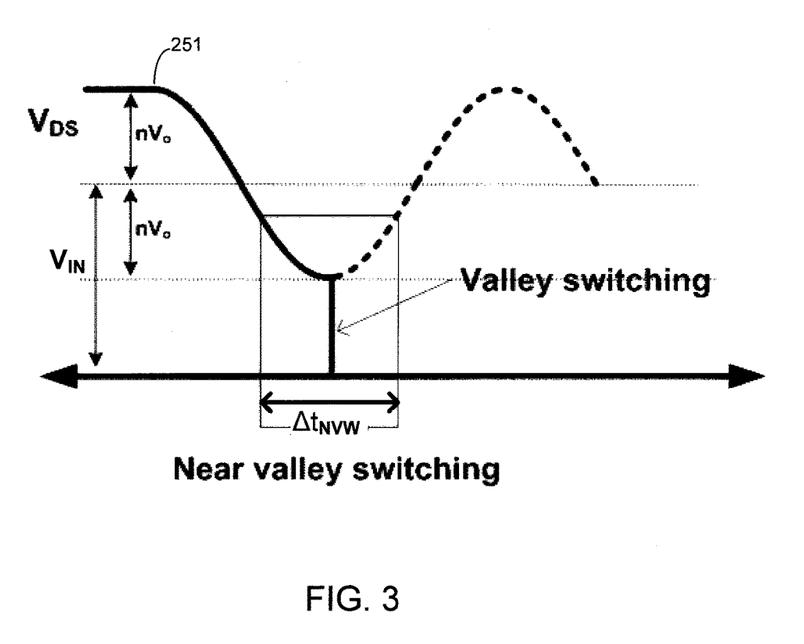
FIGS. 3 and 4 show waveforms of a voltage across a switch element of a quasi-resonant converter in accordance with an embodiment of the present invention.

FIG. 3 shows a waveform of a voltage across a switch element of a quasi-resonant converter in accordance with an embodiment of the present invention. In the example of FIG. 3, the curve 251 is a waveform of the drain-source voltage VDS of a switch element that comprises a MOSFET. Instead of turning on the MOSFET only at the valley (as in valley switching), the MOSFET is also allowed to turn on during a time period referred to herein as a "near valley window" $\Delta t_{NVW}$, which is configured to be close to the valley point of the VDS voltage, either on the downswing or the upswing of the VDS voltage. In one embodiment, to reduce switching loss, the near valley window $\Delta t_{NVW}$ should be configured to be around the valley point of the VDS voltage, or within a negative half cycle of the VDS resonant ring relative to the input voltage VIN.

Near valley switching may be allowed based on when the blanking period expires relative to the near valley window $\Delta t_{NVW}$. For example, the MOSFET may be turned on immediately when the blanking period TB ends within the near valley window $\Delta t_{NVW}$. When the blanking period TB ends outside the near valley window $\Delta t_{NVW}$ (i.e., after the near valley window $\Delta t_{NVW}$) the MOSFET may be turned on at either the next allowed near valley window $\Delta t_{NVW}$ or at the end of the waiting period TW.

Figure 4:
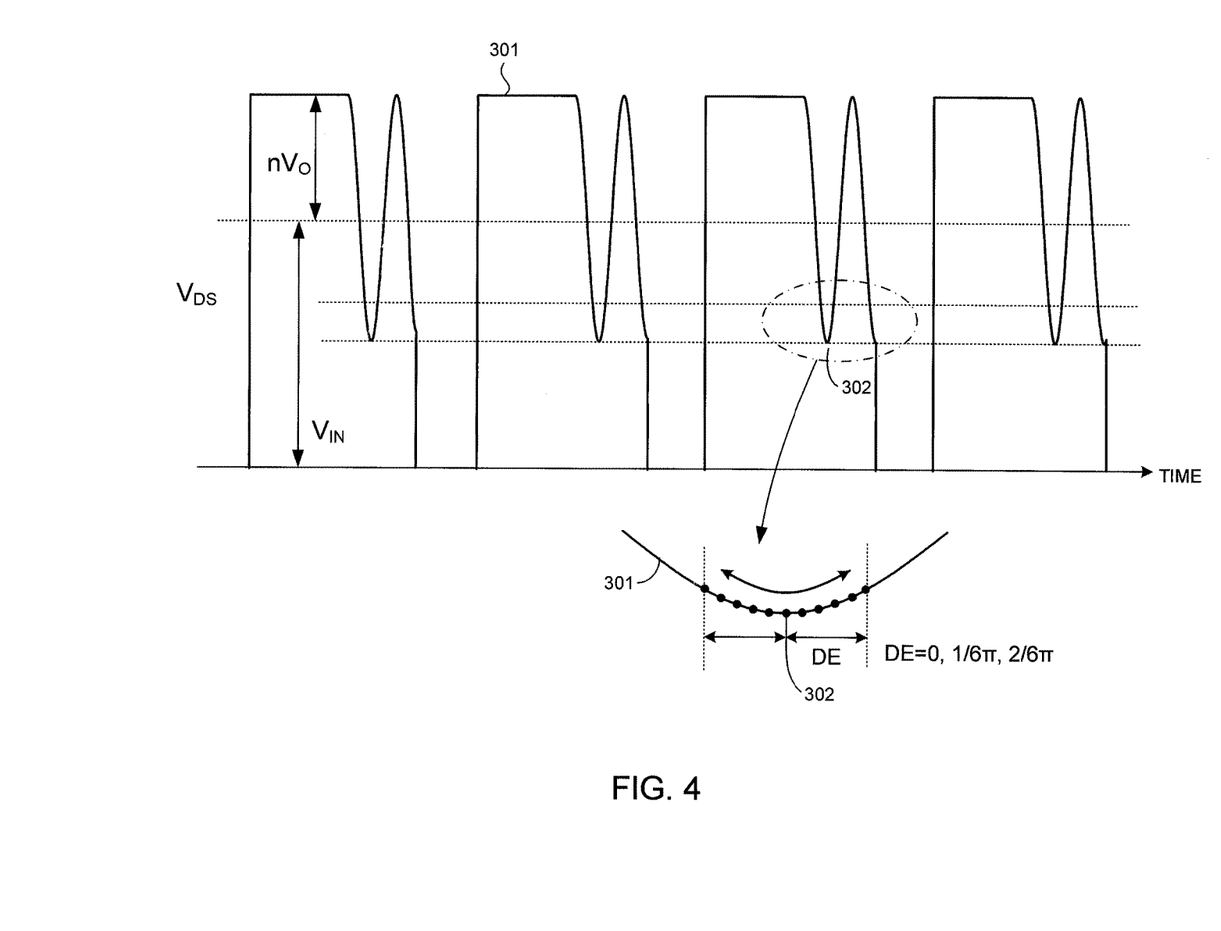

FIG. 4 shows another waveform of a voltage across a switch element of a quasi-resonant converter in accordance with an embodiment of the present invention. In the example of FIG. 4, the curve 301 is a waveform of the drain-source voltage VDS of a switch element that comprises a MOSFET. In a quasi-resonant converter, the MOSFET is coupled to a primary winding of a transformer. When the MOSFET is turned off, its drain-source voltage resonates at a resonant frequency dictated by a resonant circuit formed by the inductance of the primary winding and a parasitic capacitance of the MOSFET (or some other capacitor). In the example of FIG. 4, the peak of the drain-source voltage VDS corresponds to the input voltage VIN plus the reflected output voltage VO (i.e., nVO, where n is the turn ratio of the transformer). The sinusoidal portions of the curve 301 represent the drain-source voltage VDS at resonance after the MOSFET is turned off.

In the example of FIG. 4, the valley 302 is the valley at resonance after the MOSFET is turned off. The valley 302 is the minimum value of the drain-source voltage of the MOSFET at resonance. Also shown in FIG. 4 is an enlarged version of the portion of the curve 301 showing the valley 302. In one embodiment, near valley switching involves turning on the MOSFET at a point in time near the valley 302. That is, the MOSFET can be turned on not only at the valley but also within a few radians away from the valley. For example, the MOSFET can be turned on at DE radians from the valley, such as at 0, $1/6\pi$, or $2/6\pi$ radians from the valley.

In conventional quasi-resonant converters, valley switching is typically performed to minimize switching loss. However, switching near the valley slightly does not result in significant switching loss. That is, switching loss arising from near valley switching is not too significant compared to valley switching. Near valley switching is thus a viable design option when there is a strict limitation on the switching frequency range of the switch element.

Figure 5:
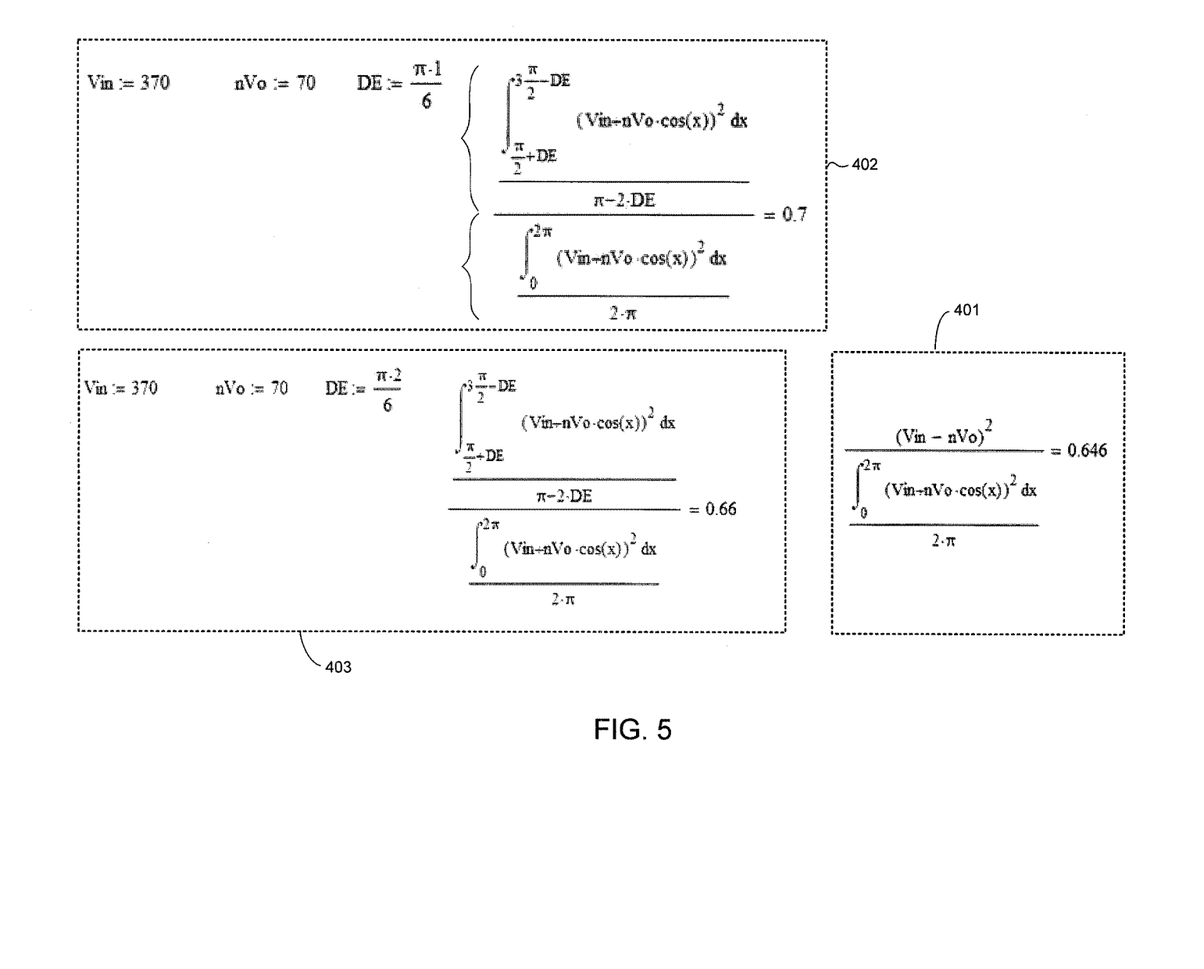
FIG. 5 shows example calculations that compare valley switching versus near valley switching.

FIG. 5 shows example calculations that compare the switching loss of valley switching versus the switching loss of near valley switching. The example of FIG. 5 shows power loss calculations with VIN=370V and nVO=70 for valley switching, i.e., DE=0 (calculation block 401), near valley switching with DE=$\pi/6$ radians (calculation block 402), and near valley switching with DE=$\pi 2/6$ radians (calculation block 403). The resulting power loss ratios, which are 0.646, 0.66, and 0.7 for calculation blocks 401, 403, and 402, respectively, indicate that switching loss with near valley switching is comparable to that of valley switching.

Figure 6:
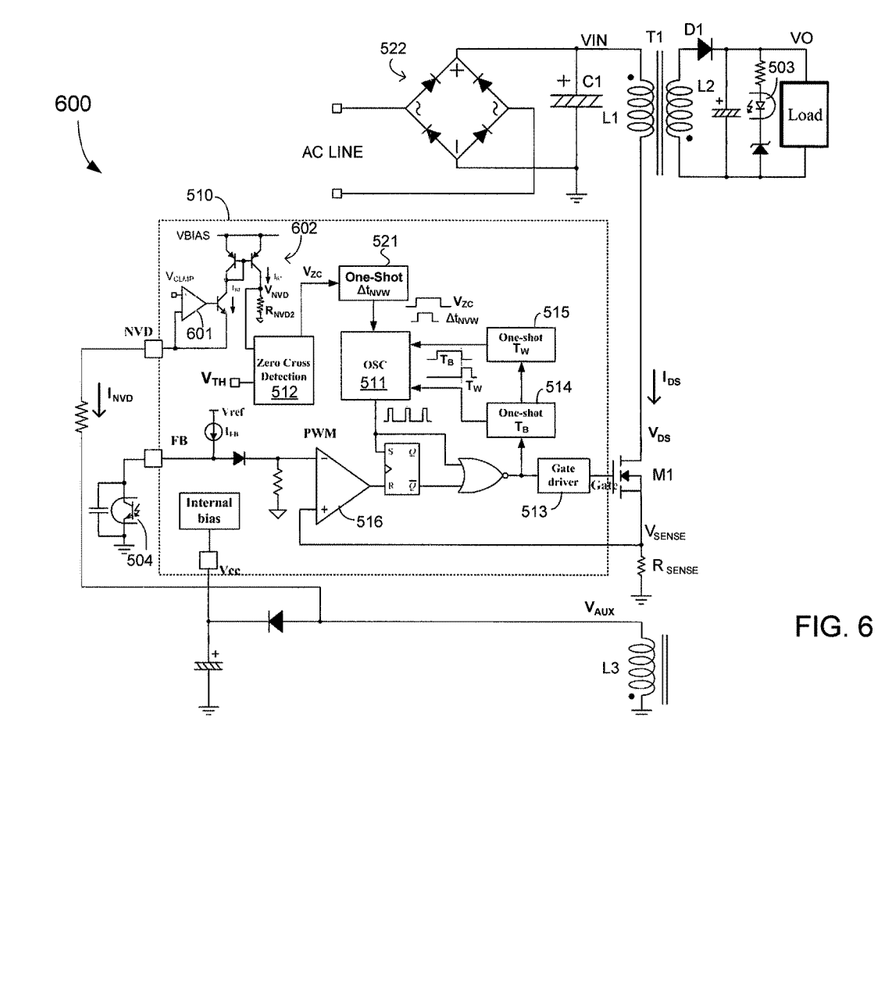
FIG. 6 shows an SMPS with near valley switching in accordance with an embodiment of the present invention.
Figure 7:
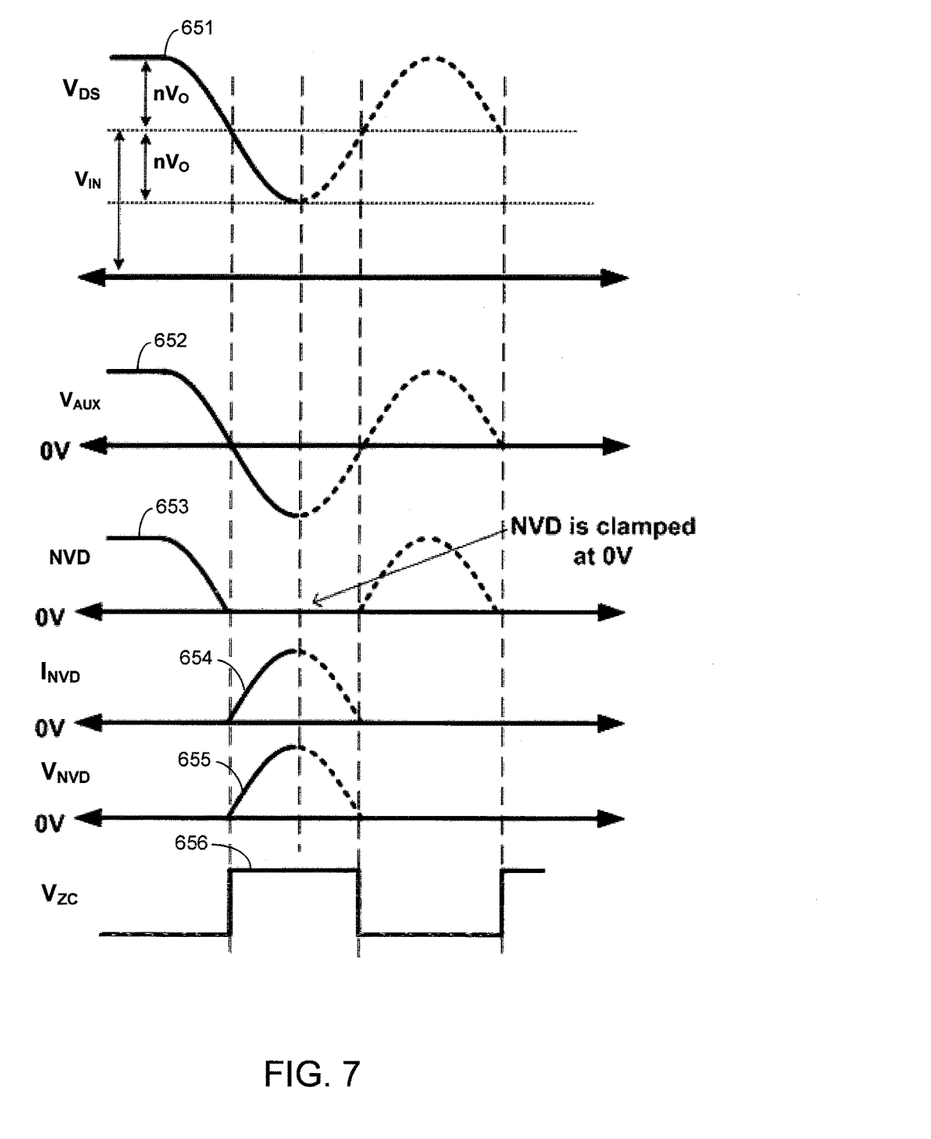
FIG. 7 shows waveforms of nodes of the SMPS of FIG. 6 in accordance with an embodiment of the present invention.

FIG. 6 shows an SMPS 600 with near valley switching in accordance with an embodiment of the present invention. FIG. 7 shows example waveforms on key nodes of the SMPS 600. FIG. 6 is best understood in conjunction with the waveforms of FIG. 7, which shows, from top to bottom, waveforms of the drain-source voltage VDS of the transistor M1 (curve 651), auxiliary voltage VAUX on the auxiliary winding L3 (curve 652), the clamped voltage on the NVD pin (curve 653), the INVD current flowing through the NVD pin (curve 654), the VNVD voltage on the resistor RNVD2 (curve 655), and the zero-cross indicative signal VZC from the zero-crossing detection circuit 512 (curve 656).

In the example of FIG. 6, the SMPS 600 receives an AC line voltage. A rectifier circuit 522 and an input capacitor C1 develop an input voltage VIN on a node of a primary winding L1 of a transformer T1. A switch element in the form of a transistor M1 (e.g., a MOSFET) connects and disconnects the primary winding L1 to ground to develop an output voltage VO for a load on the secondary winding L2 side of the transformer T1. The transistor M1 is also referred to as the "primary switch."

In the example of FIG. 6, a controller integrated circuit (IC) 510 (or some discrete controller) controls the switching operation of the transistor M1, e.g., by PWM, to develop the output voltage VO. In the example of FIG. 6, the controller IC 510 implements a quasi-resonant converter with near valley switching, with the resonant circuit being formed by the inductance of the primary winding L1 and the lumped parasitic capacitance at the drain of the transistor M1. The controller 510 may include the NVD pin for receiving the auxiliary voltage VAUX, an FB pin for receiving a feedback voltage, a VCC pin for receiving a supply voltage, and a GATE pin coupled to the gate of the transistor M1.

In the example of FIG. 6, the controller IC 510 senses the drain-source current IDS of the transistor M1 from a sense voltage VSENSE developed by the drain-source current IDS on a resistor RSENSE. The controller IC 510 may receive at the FB pin a feedback signal indicative of the output voltage VO by way of a photo transistor 504 that forms an opto-coupler with a photo diode 503 on the secondary side. A comparator 516 compares the sense voltage VSENSE to a feedback voltage developed from the feedback signal to determine when to turn off the transistor M1.

The transformer T1 further includes an auxiliary winding L3 on the primary side for developing an auxiliary voltage VAUX. An internal bias circuit may generate an internal supply voltage from the auxiliary voltage VAUX. The voltage across the primary winding L1 may be determined by subtracting the input voltage VIN from the drain-source voltage of the transistor M1. Therefore, the auxiliary voltage VAUX is indicative of the drain-source voltage of the transistor M1 (see VAUX and VDS on FIG. 7). A corresponding voltage at the NVD pin may be developed from the auxiliary voltage VAUX and clamped by a clamping circuit comprising a comparator 601 at 0V when the auxiliary voltage VAUX is negative. A replica circuit comprising a current mirror 602 and a resistor RNVD2 allows the clamped voltage to be replicated within the controller IC 510. More specifically, the current mirror 602 reflects current generated from the clamped voltage of 0V and negative auxiliary voltage VAUX to generate a voltage VNVD on a resistor RNVD2, which is input to a zero-cross detection circuit 512. The voltage VNVD is a replica of the voltage at the NVD pin.

In the example of FIG. 6, the zero-cross detection circuit 512 compares the voltage VNVD to a reference threshold voltage VTH to detect the zero-crossing of the drain-source voltage of the transistor M1 relative to the reference threshold voltage VTH. In one embodiment, the zero-crossing detection circuit 512 generates a zero-cross indicative signal VZC based on whether the VDS resonance voltage of the transistor M1 is on the positive or negative half cycle relative to the input voltage VIN. In the example of FIG. 6, the zero-cross indicative signal VZC is high when the VDS resonance voltage is on the negative half cycle and the zero-cross indicative signal VZC is low when the VDS resonance voltage is on the positive half cycle (see VZC on FIG. 7). In the example of FIG. 6, a one-shot circuit 521 is triggered to generate a near valley window $\Delta t_{NVW}$ pulse on the rising edge of the zero-cross indicative signal VZC.

In the example of FIG. 6, the controller IC 510 includes a gate driver 513 that drives the gate of the transistor M1. When the transistor M1 is turned off as indicated by its gate voltage, a one-shot circuit 514 generates a pulse that corresponds to the blanking period TB. The oscillator circuit 511 does not send a short pulse to turn on the transistor M1 during the blanking period. In response to the expiration of the blanking period, a one-shot circuit 515 generates another pulse that corresponds to the waiting period TW before timeout. The waiting period TW is also referred to as the system-allowed switching frequency range. The oscillator circuit 511 generates a short pulse to turn on the transistor M1 after a propagation delay TPD (see FIGS. 8 and 9) either at the moment when the blanking period TB expires within the near valley window $\Delta t_{NVW}$ or at the expiration of the waiting period TW.

In the example of FIG. 6, the oscillator circuit 511 generates a short pulse to turn on the transistor M1 when the falling edge of the blanking period TB pulse occurs at a time when the near valley window $\Delta t_{NVW}$ pulse is high, i.e., asserted. When the falling edge of the blanking period TB pulse occurs at a time when the near valley window $\Delta t_{NVW}$ pulse is low, the oscillator circuit 511 generates a short pulse to turn on the transistor M1 either at the next allowed near valley window $\Delta t_{NVW}$ or at the end of the waiting period TW, whichever occurs first.

Figure 8:
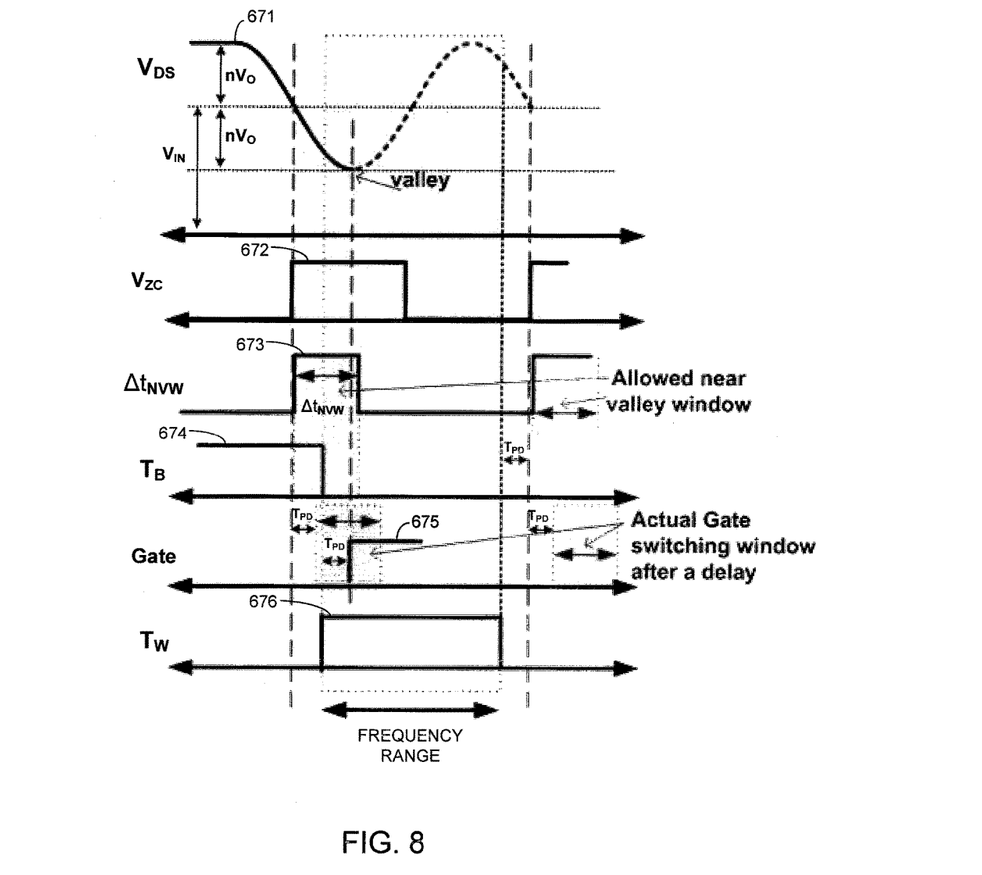
FIGS. 8 and 9 show waveforms of example operations of the SMPS of FIG. 6 in accordance with an embodiment of the present invention.

FIG. 8 shows waveforms of the SMPS 600 in the case where the blanking period TB ends within the near valley window $\Delta t_{NVW}$. FIG. 8 shows, from top to bottom, waveforms of the drain-source voltage VDS of the transistor M1 (curve 671), the zero-cross indicative signal VZC (curve 672), the near valley window $\Delta t_{NVW}$ pulse output of the one-shot circuit 521 (curve 673), the blanking period TB pulse output of the one-shot circuit 514 (curve 674), voltage on the gate of the transistor M1 (curve 675), and the waiting period TW pulse of the one-shot circuit 515 (curve 676).

In the example of FIG. 8, the near valley window $\Delta t_{NVW}$ starts at the rising edge of the zero-crossing indicative signal VZC. When the blanking period TB ends within the near valley window $\Delta t_{NVW}$, the gate (curve 673) of the transistor M1 is asserted to allow the transistor M1 to be turned on immediately after a propagation delay TPD. In this example, the allowed gate switching window is thus the allowed near valley switching window $\Delta t_{NVW}$ in addition of a propagation delay TPD, which is close to the actual valley of the drain-source voltage VDS.

Figure 9:
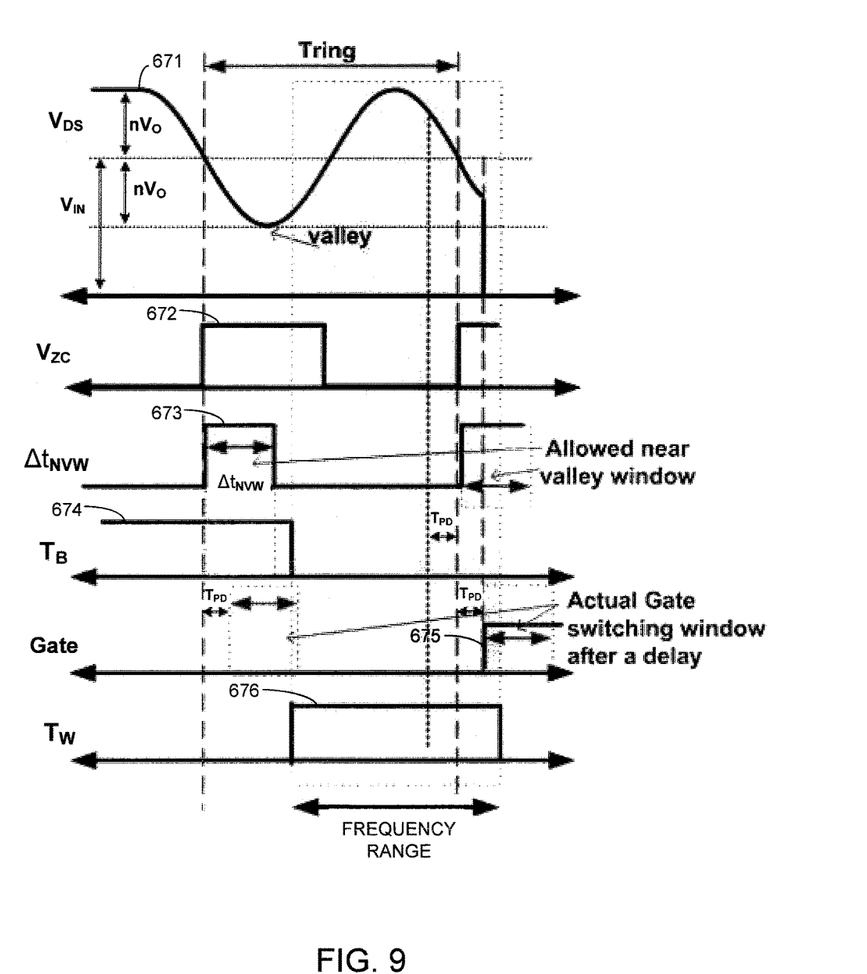

FIG. 9 shows waveforms of the SMPS 600 in the case where the blanking period TB ends outside of the near valley window $\Delta t_{NVW}$, i.e., after the near valley window $\Delta t_{NVW}$. FIG. 9 shows, from top to bottom, waveforms of the drain-source voltage VDS of the transistor M1 (curve 671), the zero-cross indicative signal VZC (curve 672), the near valley window $\Delta t_{NVW}$ pulse output of the one-shot circuit 521 (curve 673), the blanking period TB pulse output of the one-shot circuit 514 (curve 674), voltage on the gate of the transistor M1 (curve 675), and the waiting period TW pulse of the one-shot circuit 515 (curve 676). In the case of FIG. 9, the gate of the transistor M1 may be asserted to turn the transistor M1 on either at the next allowed near valley window $\Delta t_{NVW}$ or at the end of the waiting period TW. In one embodiment, the width of the near valley window $\Delta t_{NVW}$ may be optimized by satisfying, $$\Delta t_{NVW} + T_W > T_{RING}$$

where $T_{RING}$ is the resonant ring period. Thus, the transistor M1 will always be turned on close to the valley, or near valley, with the allowed switching frequency range of TW.

As can be appreciated from the foregoing, embodiments of the present invention include many features heretofore not realized including, but not limited to, a quasi-resonant converter with a limited allowed switching frequency range of waiting period TW that starts after the blanking period TB; switching is allowed within the waiting period TW, not only at the valley of the drain-source resonance voltage of the primary switch, but also allowed within a window range close to the valley (i.e., near valley window) either on the downswing or the upswing around the valley; switching is allowed immediately after a propagation delay TPD after blanking period TB if the blanking period TB ends within the near valley window; switching is allowed at the beginning of near valley window after a propagation delay TPD if the blanking period TB ends outside of the near valley window; switching is forced at the end of the waiting period TW; switching is controlled at the negative half cycle of the drain-source resonance voltage of the primary switch by enabling a near valley window starting after detecting the drain-source resonance voltage on the downswing zero-crossing; zero crossing is detected by comparing the replica of drain-source resonance voltage to a reference threshold.

Power supplies with near valley switching have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. An electrical circuit comprising:
a controller that is configured to detect a zero-crossing of a drain-source resonance voltage of a metal oxide field effect transistor (MOSFET) that is coupled to a primary winding of a transformer relative to an input voltage, to generate a signal indicating occurrence of a near valley window time period in response to detecting the zero-crossing of the drain-source resonance voltage of the MOSFET, and to turn on the MOSFET before or after a minimum value of the drain-source resonance voltage of the MOSFET within a range of time during the near valley window time period when a blanking period during which the MOSFET is prohibited from being turned on ends within the near valley window time period,
wherein the controller comprises:
a clamping circuit that is configured to clamp a sensed drain-source voltage of the MOSFET to generate a clamped voltage;
a replica circuit that generates a replica of the clamped voltage within the controller; and
a zero-crossing detection circuit that detects the zero-crossing of the drain-source resonance voltage of the MOSFET from the replica of the clamped voltage.

2. The electrical circuit of claim 1, wherein the controller is configured to turn on the MOSFET at a next near valley window time period or at an end of a waiting period when the blanking period ends outside the near valley window time period.

3. The electrical circuit of claim 1, wherein the capacitance comprises lumped parasitic capacitance at a drain of the MOSFET.

4. The electrical circuit of claim 1, wherein the controller further comprises:
a one-shot circuit that generates the signal indicating the occurrence of the near valley window time period in response to detecting the zero-crossing of the drain-source resonance voltage of the MOSFET.

5. A method comprising:
sensing a drain-source resonance voltage of a primary switch at resonance, the primary switch being at resonance when an inductance of a primary winding of a transformer to which the primary switch is coupled resonates with a capacitance when the primary switch is turned off;
allowing the primary switch to be turned on within a range of time during a near valley window time period that occurs during a negative half cycle of the drain-source resonance voltage of the primary switch relative to an input voltage; and
turning on the primary switch before or after a minimum value of the drain-source resonance voltage of the primary switch during the near valley window time period,
wherein sensing the drain-source resonance voltage of the primary switch at resonance comprises:
detecting an auxiliary voltage at an auxiliary winding of the transformer;
clamping the auxiliary voltage to generate a clamped voltage; and
detecting a zero-crossing of the drain-source resonance voltage of the primary switch from the clamped voltage.

6. The method of claim 5, wherein the primary switch is turned on during the near valley window time period when a blanking period during which the primary switch is prevented from being turned on ends during the near valley window time period.

7. The method of claim 5, further comprising:
turning on the primary switch outside the near valley time period when a blanking period during which the primary switch is prevented from being turned on does not end during the near valley window time period and a waiting period expires.

8. The method of claim 5, further comprising:
initiating the near valley window time period in response to the detection of the zero-crossing of the drain-source resonance voltage of the primary switch.

9. The method of claim 5, wherein the primary switch comprises a metal oxide semiconductor field effect transistor (MOSFET) and the capacitance is at the drain of the MOSFET.

10. A switched mode power supply comprising:
a transformer having a primary winding and a secondary winding;
a metal oxide semiconductor (MOS) transistor that is coupled to the primary winding; and
a controller that is configured to control a switching operation of the primary switch to couple and decouple the primary winding to an input voltage, to detect a drain-source resonance voltage of the MOS transistor at resonance, to start a near valley window time period in response to zero-crossing of the drain-source resonance voltage, and to allow the MOS transistor to be turned on before or after a minimum value of the drain-source resonance voltage of the MOS transistor within a range of time during the near valley window time period,
wherein the controller is an integrated circuit (IC) and comprises:
a clamping circuit that is configured to clamp a sensed drain-source resonance voltage of the MOSFET to generate a clamped voltage;
a replica circuit that generates a replica of the clamped voltage inside the controller; and
a zero-crossing detection circuit that detects the zero-crossing of the drain-source resonance voltage of the MOS transistor from the replica of the clamped voltage.

11. The power supply of claim 10, wherein the MOS transistor is a MOSFET.

12. The power supply of claim 10, wherein the controller is configured to turn on the MOS transistor when a blanking period during which the MOS transistor is prevented from being turned on ends during the near valley window time period.

13. The power supply of claim 12, wherein the controller is configured to turn on the MOS transistor in a next near valley window time period when the blanking period ends outside the near valley window time period.

14. The power supply of claim 12, wherein the controller is configured to turn on the MOS transistor at an end of a waiting period when the blanking period ends outside the near valley window time period.

* * * * *